(12) United States Patent
Hoffman et al.

(10) Patent No.: US 9,008,833 B2
(45) Date of Patent: Apr. 14, 2015

(54) DYNAMIC ROUTING CONTROL METHODS AND SYSTEMS FOR A CLUSTER TOOL

(75) Inventors: James Hoffman, San Jose, CA (US); Hong Soon Kim, San Jose, CA (US); Atsushi Kitani, Nara (JP)

(73) Assignee: Applied Materials, Inc., Santa Clara, CA (US)

( * ) Notice: Subject to any disclaimer, the term of this patent is extended or adjusted under 35 U.S.C. 154(b) by 281 days.

(21) Appl. No.: 13/594,750

(22) Filed: Aug. 24, 2012

(65) Prior Publication Data

US 2013/0226336 A1    Aug. 29, 2013

Related U.S. Application Data

(60) Provisional application No. 61/528,008, filed on Aug. 26, 2011.

(51) Int. Cl.
G06F 7/00 (2006.01)
B25J 9/16 (2006.01)
G05B 19/418 (2006.01)

(52) U.S. Cl.
CPC .......... *B25J 9/1656* (2013.01); *G05B 19/41865* (2013.01); *G05B 2219/32258* (2013.01); *G05B 2219/32271* (2013.01); *G05B 2219/32283* (2013.01); *G05B 2219/32291* (2013.01); *G05B 2219/32304* (2013.01); *G05B 2219/45031* (2013.01)

(58) Field of Classification Search
CPC .............. G05B 19/41865; G05B 2219/45031; H01L 21/67276
USPC .......................................................... 700/228
See application file for complete search history.

(56) References Cited

U.S. PATENT DOCUMENTS 5,928,389 A * 7/1999 Jevtic .......................... 29/25.01
2007/0282474 A1 * 12/2007 Schmidt ......................... 700/99

* cited by examiner

*Primary Examiner* — Gene Crawford
*Assistant Examiner* — Kyle Logan
(74) *Attorney, Agent, or Firm* — Dugan & Dugan, PC

(57) ABSTRACT

Systems, methods, and apparatus are provided for operating a cluster tool including receiving recipe time data; receiving transfer time data; receiving process programs and associated substrate lots wherein the process programs include a plurality of sequences; determining cluster tool chambers associated with sequences that are bottleneck sequences; setting equipment constant values for components of the cluster tool to implement transfer priorities wherein the chambers associated with bottleneck sequences are given highest priority; executing a next sequence based on the transfer priorities; and repeating the determining, setting and executing for each remaining sequence. Numerous additional aspects are disclosed.

20 Claims, 6 Drawing Sheets

| CHAMBER<br>302 | RECIPE NAME<br>304 | RECIPE TIME<br>306 |
|---|---|---|
| CLUSTER 1:<br>CVD CHAMBER A | NP300 | 600000 sec |
| CLUSTER 1:<br>CVD CHAMBER B | RS400 | 200000 sec |
| CLUSTER 1:<br>CVD CHAMBER C | BM900 | 900000 sec |
| CLUSTER 1:<br>CVD CHAMBER D | SS500 | 100000 sec |

*FIG. 3*

| SOURCE 402 | DESTINATION 404 | TRANSFER TIME 406 |
|---|---|---|
| CLUSTER 1: TRANSFER CHAMBER | CLUSTER 1: HEAT CHAMBER | 2153 msec |
| CLUSTER 1: HEAT CHAMBER | CLUSTER 1: TRANSFER CHAMBER | 2246 msec |
| CLUSTER 1: CVD CHAMBER | CLUSTER 1: TRANSFER CHAMBER | 2146 msec |
| CLUSTER 1: TRANSFER CHAMBER | CLUSTER 1: CVD CHAMBER | 1939 msec |

DYNAMIC ROUTING CONTROL METHODS AND SYSTEMS FOR A CLUSTER TOOL

The present application claims priority to U.S. Provisional Patent Application Ser. No. 61/528,008, filed Aug. 26, 2011, which is hereby incorporated by reference herein in its entirety.

FIELD OF THE INVENTION

The present invention relates generally to electronic device manufacturing, and more specifically to dynamic routing control methods and systems for a cluster tool.

BACKGROUND

The chambers in a cluster tool are expensive resources that are wasted if allowed to sit idle. Thus, whenever possible, an operator will attempt to optimize the use of the tool in terms of minimizing the amount of time it takes for a substrate lot to be processed. However, it may be difficult and time consuming to manually optimize operation of a cluster tool to process a substrate lot even when all substrates in the lot are to follow similar paths through the tool and undergo the same processing. The amount of time saved by optimizing may not always exceed the amount of time employed to optimize a tool for processing the lot. Typically, a fairly large number of substrates must be processed to realize the benefit. And, even worse, in the case where each substrate in a lot is to undergo different process steps from the other substrates, the time employed to optimize a conventional cluster tool for each set of different process steps would likely exceed the amount of time saved by optimizing. This may be true no matter how many substrates are processed since the tool may need to be reconfigured for each substrate. Therefore, what is needed are methods and systems to optimize a cluster tool such that time saved by operating while optimized is not lost by the time it takes to optimize operation of the cluster tool.

SUMMARY OF THE INVENTION

In some aspects of the invention, a method of operating a cluster tool is provided. The method includes receiving recipe time data; receiving transfer time data; receiving process programs and associated substrate lots wherein the process programs include a plurality of sequences; determining cluster tool chambers associated with sequences that are bottleneck sequences; setting equipment constant values for components of the cluster tool to implement transfer priorities wherein the chambers associated with bottleneck sequences are given highest priority; executing a next sequence based on the transfer priorities; and repeating the determining, setting and executing for each remaining sequence.

In some other aspects of the invention, a cluster tool is provided that includes a transfer chamber including a transfer robot; a plurality of chambers serviced by the transfer robot; and a controller including a memory. The controller is adapted to store instructions adapted to: receive recipe time data; receive transfer time data; receive process programs associated with substrate lots wherein the process programs include a plurality of sequences; determine cluster tool chambers associated with sequences that are bottleneck sequences; set equipment constant values for components of the cluster tool to implement transfer priorities wherein the chambers associated with bottleneck sequences are given highest priority; execute a next sequence based on the transfer priorities; and repeat the determine, set and execute instructions for each remaining sequence.

In some other aspects of the invention, a controller for a cluster tool is provided. The controller includes a processor; memory coupled to the processor; a recipe time database accessible by the processor; a transfer time database accessible by the processor; a user interface for controlling the cluster tool; and a plurality of instructions stored in the memory. The instructions are operative to: access recipe time data in the recipe time database; access transfer time data in the transfer time database; receive process programs associated with substrate lots received by the cluster tool wherein the process programs include a plurality of sequences; determine cluster tool chambers associated with sequences that are bottleneck sequences; set equipment constant values for components of the cluster tool to implement transfer priorities wherein the chambers associated with bottleneck sequences are given highest priority; cause the cluster tool to execute a next sequence based on the transfer priorities; and repeat the determine, set and execute instructions for each remaining sequence.

Other features and aspects of the present invention will become more fully apparent from the following detailed description, the appended claims and the accompanying drawings.

BRIEF DESCRIPTION OF THE DRAWINGS

FIG. 3 is an example of a recipe time database according to embodiments of the present invention.

DETAILED DESCRIPTION

Figure 1:
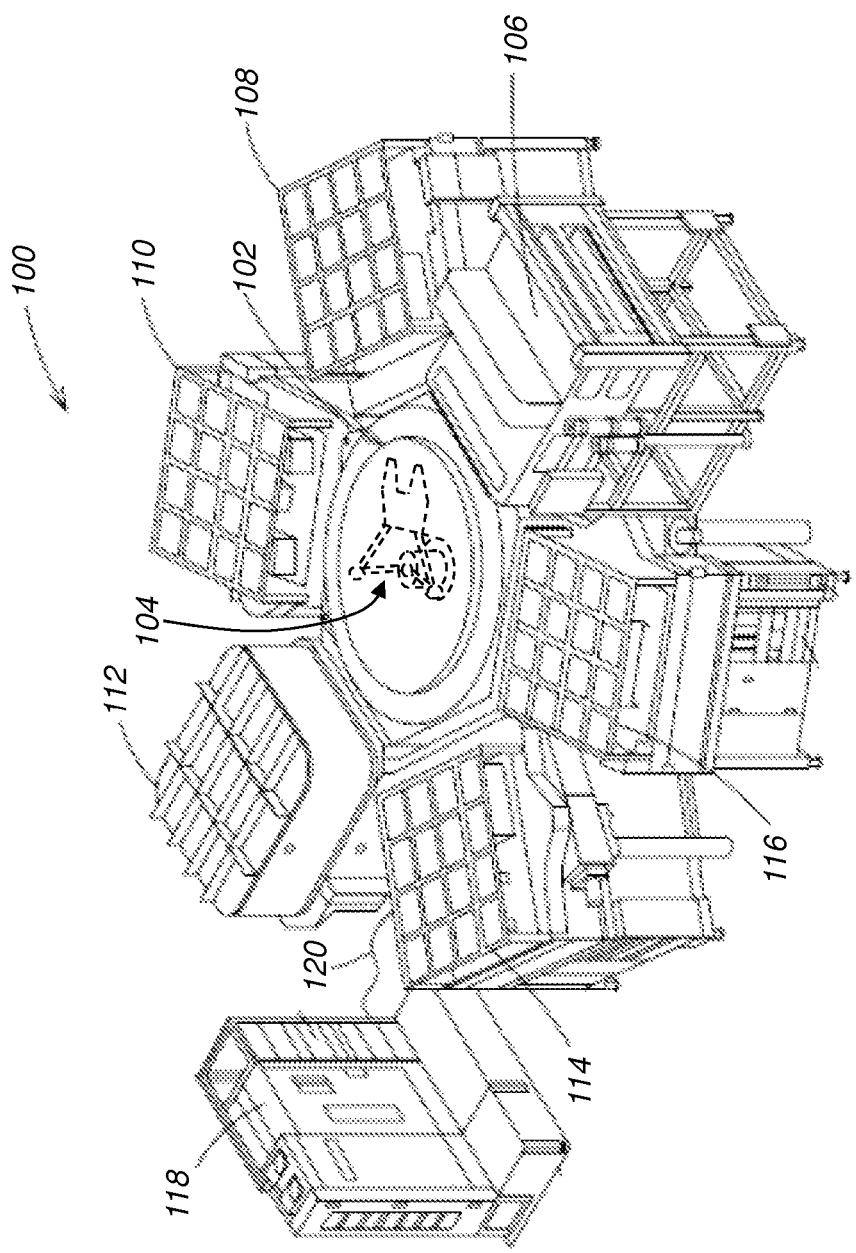
FIG. 1 is a perspective view depicting an example cluster tool according to embodiments of the present invention.
Figure 2:
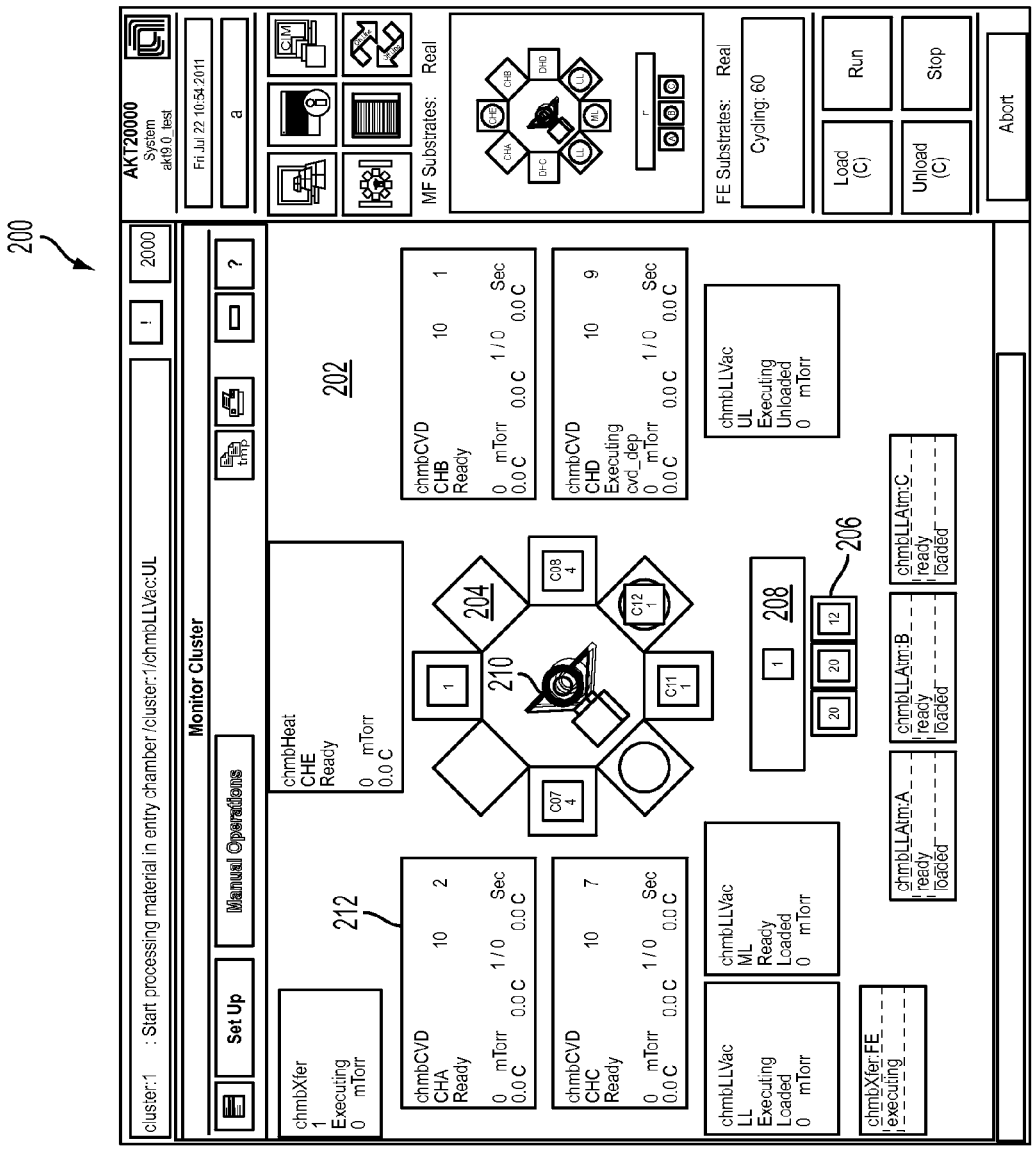
FIG. 2 is a screen shot depicting a cluster tool control interface according to embodiments of the present invention.

Manufacture of electronic devices using a cluster tool to process substrate lots may be automated so that substrates delivered to the cluster tool are loaded, transferred to various chambers in the cluster tool for processing, and unloaded, all under computer control. The substrates in a given lot may all be processed the same way, sub-groups may be processed differently, or each substrate may undergo different processing. A Process Program is a grouping of sequences that will be performed on a substrate. Process Programs are identified by a cluster tool control system with a unique identifier called a Process Program ID (PPID). A sequence of a PPID is a series of steps that defines a route between chambers in the cluster tool. Each step in a sequence is assigned to a specific chamber and each step includes one or more recipes. A recipe is a set of sub-steps applied to a substrate within a specific chamber. In a given lot of substrates, each substrate may have the same or a different PPID assigned.

Equipment Constants (ECs) define parameters for each of the various components of the cluster tool. ECs can be set to control the transfer priority of a chamber. In other words, if a chamber with a high transfer priority is ready to be loaded or unloaded, the transfer robot of the cluster tool will service the chamber with a high transfer priority before servicing a chamber with a lower transfer priority.

Transfer priority in a cluster tool is determined based on several ECs. For example, in some embodiments the Routing_priority EC of each chamber controls the priority for placing substrates into the chamber from the transfer robot; the Xfer_out_priority EC of each chamber controls the priority out from chambers to the robot; and the Transfer_order_data EC of the cluster tool controls transfer order based on each chamber's routing_priority, substrate entrance time into the cluster tool and slot priority. Depending on the various statuses and conditions of the cluster tool such as process time, loading/unloading time on the load lock chamber, and transfer time, these ECs are conventionally adjusted by a human operator to improve the performance of the cluster tool. This involves an enormous amount of evaluation and testing which is time consuming.

Within each PPID, the sequence that employs the most time to complete is called a bottleneck of the Process Program. By dynamically setting the ECs that control the transfer priority of chambers involved with the bottleneck sequence of a Process Program, these chambers can be given higher transfer priority. By increasing the transfer priority of the chambers involved with the bottleneck sequence, the amount of time that these chambers sit idle waiting to be loaded or unloaded is reduced and utilization of these chambers is increased. Using a recipe time database and a transfer time database, the system of the present invention can evaluate each sequence in a PPID to identify the relative amount of time each sequence will employ and relative transfer priorities may be set for the associated chambers. Further, after completion of each sequence, the relative amount of time each subsequent sequence will employ may be reevaluated and the relative transfer priorities may be reset. Thus, as multiple PPIDs are processed on the cluster tool, the ECs may be continually and dynamically adjusted to minimize the chamber idle times and thereby increase the overall throughput of the cluster tool. These and other aspects of the invention are described below with reference to FIGS. 1 to 5.

FIG. 1 is a perspective view of a cluster tool 100 provided in accordance with embodiments of the present invention. The cluster tool 100 includes a transfer chamber 102 which internally houses a substrate handler 104 (shown in phantom) or a transfer robot. The transfer chamber 102 is coupled to a loadlock 106, a first processing chamber 108, a second processing chamber 110, a third processing chamber 112, a fourth processing chamber 114 and a fifth processing chamber 116. Fewer or more processing chambers, fewer or more loadlocks, and more substrate handlers may be employed. A controller 118 may communicate with and/or control the processes performed within each chamber 102,108,110,112, 114,116, operation of the substrate handler 104 (e.g., transfers between chambers), and the loadlocks 106. The controller 118 may be or include a programmable gate array, logic, a microprocessor, and/or a general purpose processor operative to execute software and including communications ports, interface devices, memory, and persistent storage for storing databases, program code and the like. The controller 118 may be coupled to each of the cluster tool's components via one or more communications channels 120 (e.g., a signal wire).

Transfer chamber 102 may be sealed so as to maintain a vacuum as a substrate is passed by the substrate handler 104 between loadlock chambers 106, processing chambers 108, 110, 112, 114, 116 and transfer chamber 102. Maintaining a vacuum throughout the cluster tool 100 may prevent exposure of the substrate to contaminants (e.g., $O_2$, particulate matter, etc.).

Loadlock chambers 106 may include any conventional loadlock chambers capable of transferring substrates from a factory interface (not shown) or another source to the transfer chamber 102.

In some embodiments of the invention, the first processing chamber 108 may be adapted to clean a substrate prior to subsequent processing. For example, the first processing chamber 108 may be a conventional preclean chamber that employs any suitable preclean process such as Ar, He, $H_2$ or $N_2$ sputtering to remove a native oxide or otherwise clean a surface of a substrate. A $Cl_2$ or other chlorine-based cleaning process also may be used.

The second processing chamber 110, the third processing chamber 112, the fourth processing chamber 114, and/or the fifth processing chamber 116, if employed, may include any suitable processing chamber such as a plasma chamber, film formation chamber, a heating chamber, etc. An exemplary chamber may be, for example, the Epi Centura® system and the Poly Gen® system available from Applied Materials, Inc., located in Santa Clara, Calif., although other chambers and/or systems may be used.

Each processing chamber 108, 110, 112, 114, 116 may be coupled to one or more appropriate gas supplies for receiving any gasses employed during processing. For example, the first processing chamber 108 may be coupled to a source of hydrogen, and receive hydrogen during any precleaning process performed within the first processing chamber 108. Similarly, the second, third, fourth and/or fifth processing chambers 110, 112, 114, 116 may be coupled to sources of a carrier gas (e.g., hydrogen, nitrogen, etc.), etchant gases (e.g., HCl, $Cl_2$, etc.), silicon sources (e.g., silane, disilane, etc.), carbon sources, germanium sources, other dopant sources, etc.

The controller 118 may be a computer adapted to run software programs to control operation of the components of the cluster tool 100. Turing to FIG. 2, an image captured from an I/O display screen 200 of an example controller 118 is shown. The image depicts an example user interface 202 for controlling the cluster tool 100. The user interface 202 includes representations of each of the chambers 204, loadlocks 206, factory interface 208, and transfer robot 210 of the cluster tool 100. The status 212 information regarding the chambers and load locks is also displayed along with other information about the system. Note that the number of chambers and loadlocks depicted in the example user interface 202 may not correspond to the example embodiment of FIG. 1.

In addition to a user interface 202 for controlling the cluster tool 100 and communication connections (e.g., as represented by line 120 in FIG. 1) to the various components of the cluster tool 100, the controller 118 may also include programs, software, and databases useful for dynamically adjusting the transfer priorities of the chambers. For example, the programs in the controller 118 may include a router module that dynamically sets transfer priorities via the equipment constants and controls the path substrates take through the cluster tool according to the methods described below with respect to the flowchart of FIG. 5.

Turning to FIG. 3, an example of a portion of a recipe time database 300 is provided. A recipe time database 300 may include any number of entries and each entry may include several different fields. In the example depicted, three fields are provided for each entry. The first field 302 of each entry stores a chamber identifier, the second field 304 stores data representative of a recipe name, and the third field 306 stores data representative of the time employed by the identified chamber to perform the named recipe. Note that each chamber may be able to perform each recipe or some may only be able to perform a subset of the recipes. Also, two chambers may perform the same recipe in different amounts of time.

Figure 4:
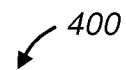
FIG. 4 is an example of a transfer time database according to embodiments of the present invention.

Turning to FIG. 4, an example of a portion of a transfer time database 400 is provided. A transfer time database 400 may include any number of entries and each entry may include several different fields. In the example depicted, three fields are provided for each entry. The first field 402 of each entry stores a source identifier, the second field 404 stores data representative of a destination identifier, and the third field 406 stores data representative of the time employed by the substrate handler 104 (and/or other device) to transfer a substrate from the identified source in field 402 to the identified destination in field 404. As indicated by the "CLUSTER 1" label, the transfer time database 400 may, in some embodiments, store entries for transfers between different clusters.

Figure 5:
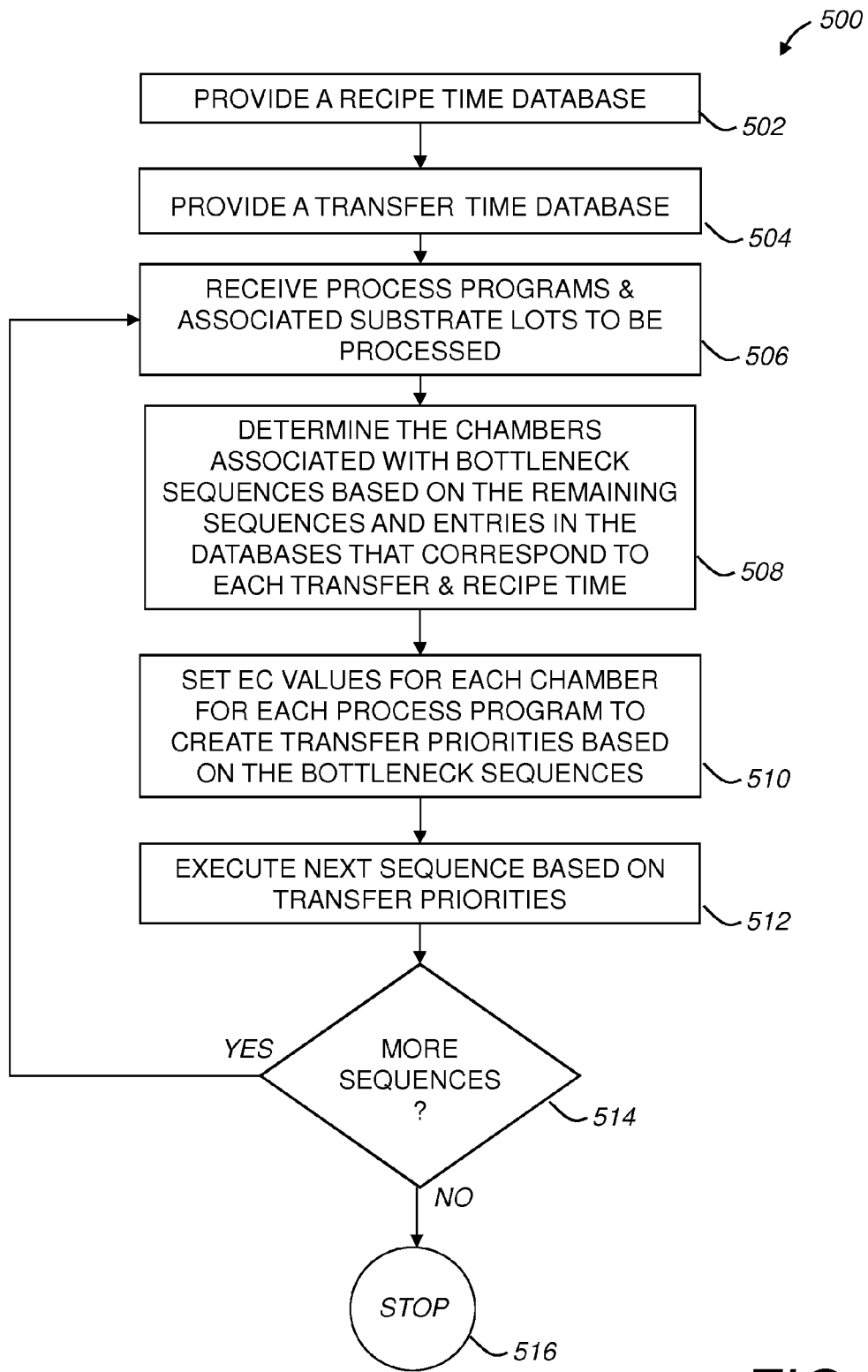
FIG. 5 illustrates a flowchart depicting an example method of dynamic routing in accordance with embodiments of the present invention.

Turning now to FIG. 5, a flow chart depicting an example embodiment of a method 500 of the present invention is provided. The method 500 begins at Block 502 wherein a recipe time database, for example a database similar to the recipe time database 300 of FIG. 3, is provided to the controller 118. The database 300 may be stored locally within the controller 118 or a remote database server hosting a recipe time database 300 may be accessed by the controller 118. Next in Block 504, a transfer time database, for example a database similar to the transfer time database 400 of FIG. 4, is provided to the controller 118. As with the recipe time database 300, the transfer time database 400 may be stored locally within the controller 118 or a remote database server hosting a transfer time database 400 may be accessed by the controller 118.

Next in Block 506, the Process Programs for a substrate lot that is available to be loaded into the cluster tool 100 is received by the controller 118. The Process Programs may initially be entered or selected by an operator using the user interface 202 and/or the Process Programs may be automatically received from a factory material control system.

Next, in Block 508, times are computed for each sequence to be executed in the Process Programs and the sequences may be ranked or ordered from longest time to shortest time. The more time a sequence employs, the more of a bottleneck the sequence is. The chambers associated with the bottleneck sequences are identified. Next in Block 510, Equipment Constants (ECs) are set for each chamber and component of the cluster tool 100 to create a transfer priority that gives the highest transfer priority to the chamber used in the sequence that is the largest bottleneck, the next highest priority to the chamber used in the sequence that is the next largest bottleneck, and so on.

In Block 512, the next sequence is executed based on the transfer priorities determined in Blocks 508 and 510. In Block 514, if there are more sequences to execute, flow returns to Block 506 where any new or remaining sequences are revaluated for bottlenecks in Block 508 and new priorities are set in Block 510. Otherwise, if all the sequences for all the Process Programs have been completed, processing stops in Block 516.

Two simplified examples of how the system of the present invention may operate are now described to illustrate further the dynamic routing priority adjustment method of the present invention. In the first example, the cluster tool is executing two different Process Programs. Process Program 1 has the following route/sequences:
 A) start at Loadlock
 B) Heat Chamber (pre-heat for 7 minutes)
 C) CVD Chamber (CVD process recipe for 100 seconds)
 D) return to Loadlock The bottleneck sequence of this Process Program is in the use of the Heat chamber and the transfer chamber. Therefore, equipment constants (ECs) would be set so that the Heat Chamber has the highest transfer priority.

Continuing with the first example, when the tool is full with substrates undergoing Process Program 1, substrates for a second Process Program (e.g., Process Program 2), arrive at the cluster tool. In this example, Process Program 2 has the same route and sequences as Process Program 1 except that the CVD Chamber process recipe time is 360 seconds instead of 100 seconds. Now, the bottleneck is within the use of the CVD chambers. According to the methods of the present invention, the routing priority will be dynamically adjusted by the controller 118 executing a router module to set the CVD Chamber to have the highest transfer priority.

In a second example of operation of the novel cluster tool of the present invention, one Process Program is executing on the cluster tool but the Process Program involves substrates going to a particular chamber more than once. In this second example, the Process Program has the following route/sequences:
 A) start at Loadlock
 B) Heat Chamber (pre-heat for 4 minutes)
 C) CVD Chamber (CVD process recipe for 200 seconds)
 D) Heat Chamber (post-annealing process for 10 minutes)
 E) return to Loadlock With this Process Program, the heat chamber is clearly the bottle neck and thus, the highest transfer priority would typically be given to the heat chamber. However, the Process Program goes to the heat chamber twice so that using a conventional static method of setting the transfer priority at the beginning of Process Program execution, does not result in improved throughput since the bottlenecks change during the Process Program. Thus, selection of the best transfer priority is unclear in a conventional system. However, using the methods of the present invention to dynamically set the transfer priority, the transfer priority with the highest tool utilization can be determined by revaluating the bottlenecks after each transfer/sequence to decide and implement new transfer priorities while the cluster tool is executing a Process Program.

Figure 6:
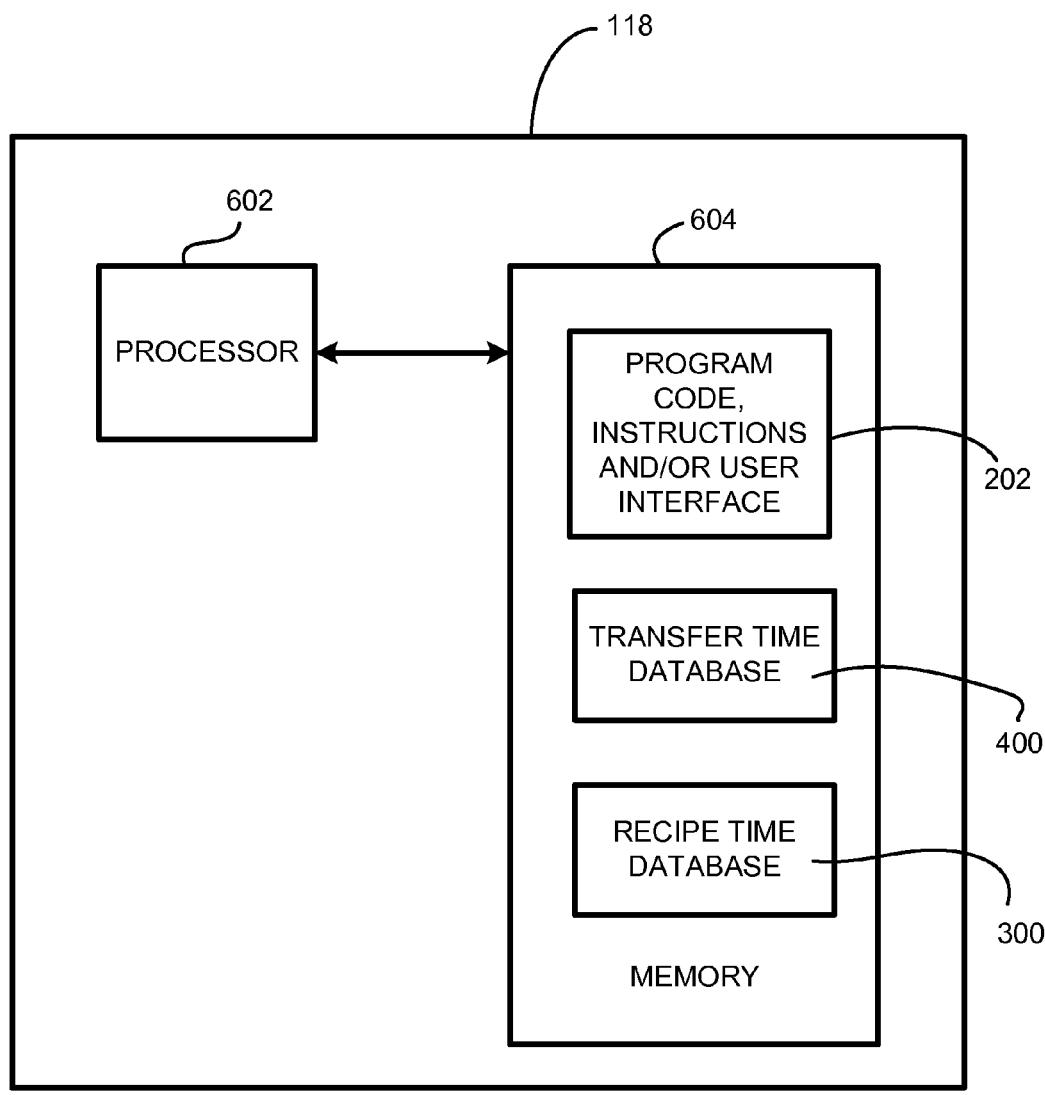
FIG. 6 is a schematic top view of an example embodiment of the controller of FIG. 1 in accordance with embodiments of the present invention.

FIG. 6 is a schematic top view of an example embodiment of the controller 118. The controller 118 may include a processor 602 coupled to a memory 604. The processor 602 may include, for example, one or more of a programmable gate array, logic, a microprocessor, and/or a general purpose processor or the like. The memory 604 may be any suitable memory device and may include one or more of program code and/or instructions for implementing the user interface 202, other program code and/or instructions, recipe time database 300, transfer time database 400, etc. In some embodiments, the controller 118 includes a plurality of instructions stored in the memory 604 and operative to (a) access recipe time data in the recipe time database 300; (b) access transfer time data in the transfer time database 400; (c) receive process programs associated with substrate lots received by the cluster tool 100 wherein the process programs include a plurality of sequences; (d) determine cluster tool chambers associated with sequences that are bottleneck sequences; (e) set equipment constant values for components of the cluster tool 100 to implement transfer priorities wherein the chambers associated with bottleneck sequences are given highest priority; (f) cause the cluster tool 100 to execute a next sequence based on the transfer priorities; and (g) repeat the determine, set and execute instructions for each remaining sequence.

The foregoing description discloses only exemplary embodiments of the invention. Modifications of the above disclosed apparatus and methods which fall within the scope of the invention will be readily apparent to those of ordinary skill in the art. For instance, while the priorities may be set based upon the sequences that take the longest to complete, in some embodiments, the priorities may be set based upon other factors including a value of the substrate(s), for example.

Accordingly, while the present invention has been disclosed in connection with example embodiments thereof, it should be understood that other embodiments may fall within the spirit and scope of the invention, as defined by the following claims.

The invention claimed is:

1. A method of operating a cluster tool comprising:
receiving recipe time data;
receiving transfer time data;
receiving process programs and associated substrate lots wherein the process programs include a plurality of sequences;
determining cluster tool chambers associated with sequences that are bottleneck sequences;
setting equipment constant values for components of the cluster tool to implement transfer priorities wherein the chambers associated with bottleneck sequences are given highest priority;
executing a next sequence based on the transfer priorities; and
repeating determining, setting and executing for each remaining sequence.

2. The method of claim 1 wherein receiving recipe time data and receiving transfer time data includes accessing a recipe time database and a transfer time database respectively.

3. The method of claim 1 wherein receiving process programs and associated substrate lots includes continuously receiving different process programs and associated substrate lots.

4. The method of claim 1 wherein determining cluster tool chambers associated with sequences that are bottleneck sequences includes calculating a total time employed for each sequence and identifying a sequence that employs more time than all others as a bottleneck sequence.

5. The method of claim 4 wherein determining cluster tool chambers associated with sequences that are bottleneck sequences further includes identifying chambers used in bottleneck sequences.

6. The method of claim 1 wherein setting equipment constant values for components of the cluster tool to implement transfer priorities includes setting equipment constants that include at least one of routing priority of a chamber, transfer out priority of a chamber, and transfer order data of the cluster tool.

7. The method of claim 1 wherein repeating determining, setting and executing further includes repeating receiving process programs and associated substrate lots.

8. A cluster tool comprising:
a transfer chamber including a transfer robot;
a plurality of chambers serviced by the transfer robot; and
a controller including a memory and adapted to store instructions adapted to:
receive recipe time data;
receive transfer time data;
receive process programs associated with substrate lots wherein the process programs include a plurality of sequences;
determine cluster tool chambers associated with sequences that are bottleneck sequences;
set equipment constant values for components of the cluster tool to implement transfer priorities wherein the chambers associated with bottleneck sequences are given highest priority;
execute a next sequence based on the transfer priorities; and
repeat the determine, set and execute instructions for each remaining sequence.

9. The cluster tool of claim 8 wherein the controller further includes a recipe time database and a transfer time database respectively.

10. The cluster tool of claim 8 wherein the instructions adapted to receive process programs and associated substrate lots includes instructions adapted to continuously receive different process programs and associated substrate lots.

11. The cluster tool of claim 8 wherein instructions adapted to determine cluster tool chambers associated with sequences that are bottleneck sequences includes instructions adapted to calculate a total time employed for each sequence and to identify a sequence that employs more time than all others as a bottleneck sequence.

12. The cluster tool of claim 11 wherein instructions adapted to determine cluster tool chambers associated with sequences that are bottleneck sequences further includes instructions adapted to identify chambers used in bottleneck sequences.

13. The cluster tool of claim 8 wherein instructions adapted to set equipment constant values for components of the cluster tool to implement transfer priorities include instructions adapted to set equipment constants that include at least one of routing priority of a chamber, transfer out priority of a chamber, and transfer order data of the cluster tool.

14. The cluster tool of claim 8 wherein instructions adapted to repeat the determine, set and execute instructions further include instructions adapted to repeat the instruction adapted to receive process programs and associated substrate lots.

15. A controller for a cluster tool comprising:
a processor;
memory coupled to the processor;
a recipe time database accessible by the processor;
a transfer time database accessible by the processor;
a user interface for controlling the cluster tool; and
a plurality of instructions stored in the memory and operative to:
access recipe time data in the recipe time database;
access transfer time data in the transfer time database;
receive process programs associated with substrate lots received by the cluster tool wherein the process programs include a plurality of sequences;
determine cluster tool chambers associated with sequences that are bottleneck sequences;
set equipment constant values for components of the cluster tool to implement transfer priorities wherein the chambers associated with bottleneck sequences are given highest priority;
cause the cluster tool to execute a next sequence based on the transfer priorities; and
repeat the determine, set and execute instructions for each remaining sequence.

16. The controller of claim 15 wherein the instructions operative to receive process programs associated with substrate lots received by the cluster tool includes instructions operative to continuously receive different process programs associated with substrate lots continuously received by the cluster tool.

17. The controller of claim 15 wherein instructions operative to determine cluster tool chambers associated with sequences that are bottleneck sequences includes instructions operative to calculate a total time employed for each sequence and to identify a sequence that employs more time than all others as a bottleneck sequence.

18. The controller of claim 17 wherein instructions operative to determine cluster tool chambers associated with sequences that are bottleneck sequences further includes instructions operative to identify chambers used in bottleneck sequences.

19. The controller of claim 15 wherein instructions operative to set equipment constant values for components of the cluster tool to implement transfer priorities include instructions operative to set equipment constants that include at least one of routing priority of a chamber, transfer out priority of a chamber, and transfer order data of the cluster tool.

20. The controller of claim 15 wherein instructions operative to repeat the determine, set and execute instructions further include instructions operative to repeat the instruction operative to receive process programs associated with substrate lots received by the cluster tool.

\* \* \* \* \*